(12) United States Patent
Zhang et al.

(10) Patent No.: US 11,829,028 B2
(45) Date of Patent: Nov. 28, 2023

(54) BACKLIGHT SOURCE AND MANUFACTURING METHOD THEREOF

(71) Applicant: SHENZHEN CHINA STAR OPTOELECTRONICS SEMICONDUCTOR DISPLAY TECHNOLOGY CO., LTD., Shenzhen (CN)

(72) Inventors: Xin Zhang, Shenzhen (CN); Yongyuan Qiu, Shenzhen (CN); Linlin Fu, Shenzhen (CN); Xi Cheng, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 204 days.

(21) Appl. No.: 17/419,787

(22) PCT Filed: Dec. 23, 2020

(86) PCT No.: PCT/CN2020/138532
§ 371 (c)(1),
(2) Date: Jun. 30, 2021

(87) PCT Pub. No.: WO2021/147601
PCT Pub. Date: Jul. 29, 2021

(65) Prior Publication Data
US 2022/0404666 A1 Dec. 22, 2022

(30) Foreign Application Priority Data
Jan. 20, 2020 (CN) .......................... 202010065801.1

(51) Int. Cl.
*G02F 1/13357* (2006.01)
*G02F 1/1335* (2006.01)

(52) U.S. Cl.
CPC .. *G02F 1/133603* (2013.01); *G02F 1/133612* (2021.01)

(58) Field of Classification Search
CPC .......................... H10K 59/131; G02F 1/13452
See application file for complete search history.

(56) References Cited

U.S. PATENT DOCUMENTS

2003/0020152 A1* 1/2003 Inoue .................. H01L 23/5387
257/E23.101
2004/0223093 A1* 11/2004 Nakayoshi ............ G02F 1/1333
349/58
(Continued)

FOREIGN PATENT DOCUMENTS

| CN | 104134679 A | 11/2014 |
|---|---|---|
| CN | 204968227 U | 1/2016 |

(Continued)

*Primary Examiner* — Andrew J Coughlin
(74) *Attorney, Agent, or Firm* — PV IP PC; Wei Te Chung; Zhigang Ma

(57) ABSTRACT

A backlight source and a manufacturing method thereof are provided. The backlight source includes a first substrate, a plurality of light sources, a driving circuit layer, and a conductive line. The light sources are distributed on an upper surface of the first substrate. The second substrate is disposed opposite to the first substrate. The driving circuit layer is disposed on a surface of a side of the second substrate away from the first substrate. An end of the conductive line is connected to one of the light sources, and another end of the conductive line is bonded to the driving circuit layer.

12 Claims, 4 Drawing Sheets

(56) References Cited

U.S. PATENT DOCUMENTS

| | | | | |
|---|---|---|---|---|
| 2013/0193871 A1* | 8/2013 | Jobert | ............... | H10K 50/824 |
| | | | | 257/40 |
| 2014/0233249 A1* | 8/2014 | Lee | ............... | H01L 23/4985 |
| | | | | 257/668 |
| 2021/0334503 A1* | 10/2021 | Liao | ............... | G02F 1/133528 |
| 2022/0229325 A1* | 7/2022 | Reeves | ............... | G02F 1/1339 |

FOREIGN PATENT DOCUMENTS

| | | | |
|---|---|---|---|
| CN | 105652522 | A | 6/2016 |
| CN | 207676943 | U | 7/2018 |
| CN | 109962095 | A | 7/2019 |
| CN | 209309942 | U | 8/2019 |
| CN | 110391279 | A | 10/2019 |
| CN | 111221181 | A | 6/2020 |
| CN | 111243495 | A | 6/2020 |
| KR | 20150037299 | A | 4/2015 |

\* cited by examiner

BACKLIGHT SOURCE AND MANUFACTURING METHOD THEREOF

RELATED APPLICATIONS

This application is a Notional Phase of PCT Patent Application No. PCT/CN2020/138532 having international filing date of Dec. 23, 2020, which claims the benefit of priority of Chinese Patent Application No. 202010065801.1 filed on Jan. 20, 2020. The contents of the above applications are all incorporated by reference as if fully set forth herein in their entirety.

FIELD

The present disclosure relates to the field of display technologies, and more particularly, to a backlight source and a manufacturing method thereof.

BACKGROUND

In recent years, with development of flat panel display technologies, liquid crystal displays (LCDs) have become a major type of display in a flat display field. As a non-self-luminous display device, LCDs need a backlight module as a light source. In a current market, edge-backlit LEDs and direct backlit LEDs are two main backlight types.

Mini-LEDs, which have a small size and can realize an ultra-thin multi-partition, are a technical development direction of a current industry. Nowadays, in the industry, mini-LEDs are used as a backlight source that is cooperated with a liquid crystal display (LCD) panel to achieve ultra-thin, high-brightness, and multi-partition. As a number of partitions increases, requirements for the partitions also increase. Therefore, an active-matrix driving method has been proposed, which drives an active matrix by using a TFT structure formed on a glass substrate cooperated with a scanning method. However, when an active-matrix structure design is applied, a conventional bonding process is used. Specifically, a flexible circuit board is connected to a glass substrate by using a COF bonding process. Wherein, a driver IC/Tcon IC is disposed on the flexible circuit board.

Active-matrix mini-LED light boards are made of glass. Therefore, they must be fragile compared to conventional PCB boards. Furthermore, when backlight sources are assembled, a PCB structure formed by using a COF bonding process is hard to place, which affects an overall structure design, especially when an all-in-one device design is required. In conventional technologies, a maximum size of surface mount technology (SMT) machines or bonding machines is 500*650 mm. Large-size display products are limited by the size of SMT machines or bonding machines. As a result, adjacent active-matrix mini-LED light boards must be spliced to each other. During a splicing process, due to a length of PCB boards, a splicing distance between two light boards is relatively wide, resulting in a long distance between light sources on two adjacent light boards. Moreover, luminous efficiency of active-matrix mini-LEDs is limited, causing a brightness of a joint of two light boards to be relatively weak, which is not beneficial for designing a backlight source. As such, a brightness uniformity of display panels is affected.

SUMMARY

The present disclosure aims to provide a backlight source and a manufacturing method thereof to solve a following technical issue: in conventional technologies, glass substrates are fragile, and distribution of light sources at a joint between two light boards is not even, affecting a brightness uniformity of display panels.

To achieve the above goal, the present disclosure provides a backlight source, including a first substrate, a plurality of light sources, a driving circuit layer, and a conductive line. The plurality of light sources are distributed on an upper surface of the first substrate. The second substrate is arranged opposite to the first substrate. A driving circuit layer is disposed on a surface of a side of the second substrate away from the first substrate. An end of the conductive line is connected to one of the light sources, and another end of the conductive line is bent and bound to the driving circuit layer.

Furthermore, the light source includes a protective layer correspondingly disposed on a lateral edge of the first substrate and a lateral edge of the second substrate and covering the conductive line.

Furthermore, the backlight source includes a through-hole penetrating the first substrate and the second substrate, wherein the through-hole is close to an end of the first substrate and an end of the second substrate. Wherein, the conductive line passes through the through-hole and is bent and bound to the driving circuit layer.

Furthermore, the light source includes an adhesive layer disposed between the first substrate and the second substrate.

Furthermore, a thickness of the adhesive layer ranges from 200 μm to 2 mm.

Furthermore, the driving circuit layer includes: a circuit board, a connector, and a driving device. The connector is disposed on a surface of a side of the circuit board and close to a lateral edge of the first substrate and a lateral edge of the second substrate. The driving device is disposed on the surface of the side of the circuit board and disposed on a same layer as the connector.

To achieve the above goal, the present disclosure further provides a method of manufacturing a backlight source, including following steps: providing a first substrate and a second substrate, wherein the second substrate and the first substrate are disposed opposite to each other; disposing a plurality of light sources on an upper surface of the first substrate; disposing a driving circuit layer on a lower surface of the second substrate, wherein the driving circuit layer is close to a lateral edge of the first substrate and a lateral edge of the second substrate; and forming a conductive line, wherein an end of the conductive line is connected to one of the light sources, and another end of the conductive line is bent and bound to the driving circuit layer.

Furthermore, the method includes a following step: forming a protective layer on the lateral edge of the first substrate and the lateral edge of the second substrate and covering the conductive line.

Furthermore, before the step of forming the conductive line, the method includes a following step: forming a through-hole penetrating an end of the first substrate and an end of the second substrate, wherein the through-hole is close to the end of the first substrate and the end of the second substrate; and the conductive line passes through the through-hole and is bent and bound to the driving circuit layer.

Furthermore, in the step of providing the first substrate and the second substrate, an upper surface of the second substrate is attached to a lower surface of the first substrate by an adhesive layer.

Regarding the beneficial effects: the present disclosure provides a backlight source and a manufacturing method thereof. A double-layer glass substrate structure replaces a conventional single-layer glass substrate structure, thereby preventing a fragile glass substrate. An end of the double-layer glass substrate is provided with a protective layer or a through-hole. The protective layer protects the a conductive line from being damaged. Conventional COF bonding structures are not used in the present disclosure, which is beneficial for structure assembly and appearance design.

DESCRIPTION OF DRAWINGS

Technical solutions and beneficial effects of the present disclosure are illustrated below in detail in conjunction with drawings and specific embodiments.

Figure 1:
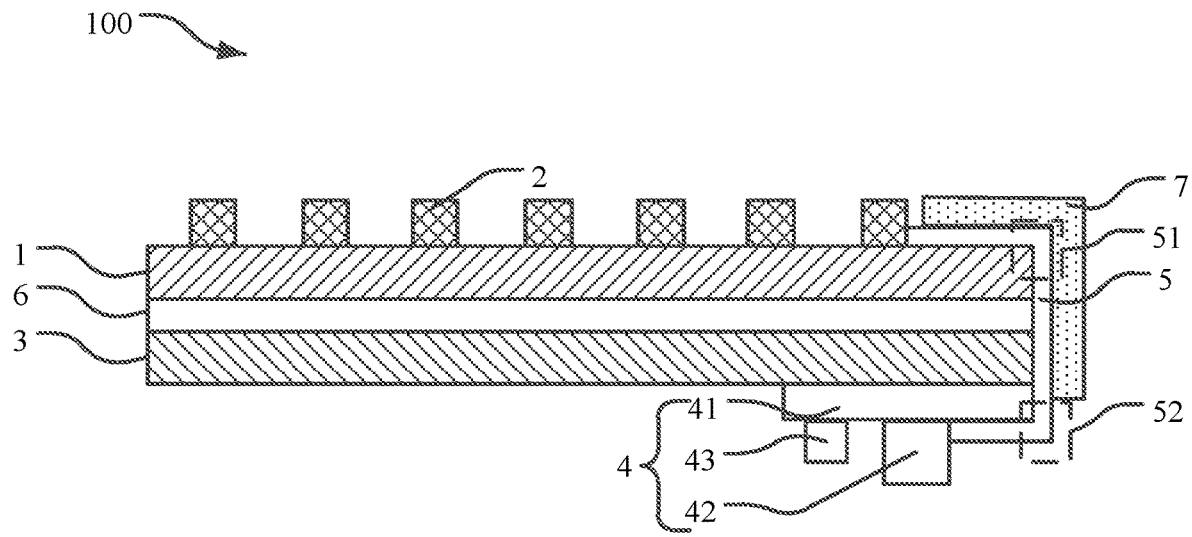
FIG. 1 is a structural schematic view showing a backlight source according to a first embodiment.

Reference numbers in the drawings are as follows:
backlight source 100;
first substrate 1; light source 2;
second substrate 3; driving circuit layer 4;
conductive line 5; adhesive layer 6;
protective layer 7;
circuit board 41; connector 42;
driving device 43;
first bending part 51; second bending part 52.

DETAILED DESCRIPTION

Hereinafter a preferred embodiment of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

In the description of the present disclosure, it should be noted that unless there are express rules and limitations, the terms such as "mount," "connect," and "bond" should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication or an interaction between two elements. A person skilled in the art should understand the specific meanings in the present disclosure according to specific situations.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The disclosure below provides many different embodiments or examples for realizing different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

First Embodiment

As shown in FIG. 1, the present embodiment provides a backlight source 100 which provides a light source for a display panel. The backlight source 100 includes a first substrate 1, a plurality of light sources 2, a second substrate 3, a driving circuit layer 4, a conductive line 5, an adhesive layer 6, and a protective layer 7.

The first substrate 1 is a glass substrate. The light sources 2 are evenly distributed on an upper surface of the first substrate 1. The light sources 2 are mini-LEDs. Wherein, the first substrate 1 and the light sources 2 are assembled to form a light board.

The second substrate 3 is also a glass substrate and is arranged opposite to the first substrate 1. A material of the second substrate 3 may be a PCB board material such as a metal core printed circuit board (MCPCB), an FR-4 epoxy glass cloth laminated plate, or a CEM-3 composite material. Among them, the FR-4 epoxy glass cloth laminated plate has characteristics of stable electrical insulation, good flatness, and smooth surface without pits. Therefore, the FR-4 epoxy glass cloth laminated plate is suitable for products requiring high-performance electronic insulation. The CEM-3 composite material is formed by curing a semi-cured glass cloth prepreg and a semi-cured glass fiber paper laminated copper foil.

The driving circuit layer 4 is disposed on a lower surface of the second substrate 3. The driving circuit layer 4 includes a circuit board 41, a connector 42, and a driving device 43. The circuit board 41 is a flexible circuit board (PCB). A connector 42 is disposed on a lower surface of the circuit board 41, is located at an end of the first substrate 1 and an end of the second substrate 3, and is close to a right lateral edge of the first substrate 1 and a right lateral edge of the second substrate 3. The connector 42 is configured to connect external wirings. The driving device 43 is disposed on the lower surface of the circuit board 41, is disposed on a same layer as the connector 42, and is configured to drive the light sources 2 to emit light.

An end of the conductive line 5 is connected to one of the light sources 2, and another end of the conductive line 5 is bent and bound to the driving circuit layer 4. Specifically, the conductive line 5 is bent along the right lateral edge of the first substrate 1 and the right lateral edge of the second substrate 3 to a bottom of the second substrate 3. The conductive line 5 has a first bending part 51 and a second bending part 52. The first bending part 51 is located at an upper right corner of the first substrate 1, and the second bending part 52 is located at a lower right corner of the second substrate 52.

When two light boards are spliced to each other, a splicing distance between the two light boards can be reduced by bending the conductive line 5 and attaching the driving circuit layer 4 to the lower surface of the second substrate 3. Therefore, the splicing distance and a distance between two light sources 2 on a single light board may be equal. As such, a brightness of any two adjacent light sources is consistent, which is beneficial for designing a backlight source. As a result, a brightness of any position on a display panel is consistent.

The adhesive layer 6 is disposed between the first substrate 1 and the second substrate 3 which are tightly bonded to each other by using a full-bonding method and or frame-bonding method. The adhesive layer 6 is a transparent colloid with high viscosity, and a thickness of the adhesive layer 6 ranges from 200 μm to 2 mm. Preferably, the thickness of the adhesive layer 6 may be 400 μm, 550 μm, 580 μm, 680 μm, 780 μm, 800 μm, 1 mm, or 1.5 mm.

The protective layer 7 is correspondingly disposed on of the first substrate 1 and the second substrate 3 and covers the conductive line 5. Specifically, the protective layer 7 is disposed on the right lateral edge of the first substrate 1 and the right lateral edge of the second substrate 3. A material of the protective layer 7 is at least one of a silica gel, a silicone resin, or an epoxy resin.

In the present embodiment, the conductive line 5 has a first bending part 51 and a second bending part 52. The protective layer 7 completely covers an outer lateral wall of the first bending portion 51, so that the first bending part 51 is wrapped, thereby protecting the conductive line 5 and preventing the conductive line 5 from being damaged when the driving circuit layer 4 is pulled. Therefore, the conductive line 5 is prevented from disconnection which affects conduction between the light source 2 and the driving circuit layer 4.

Figure 2:
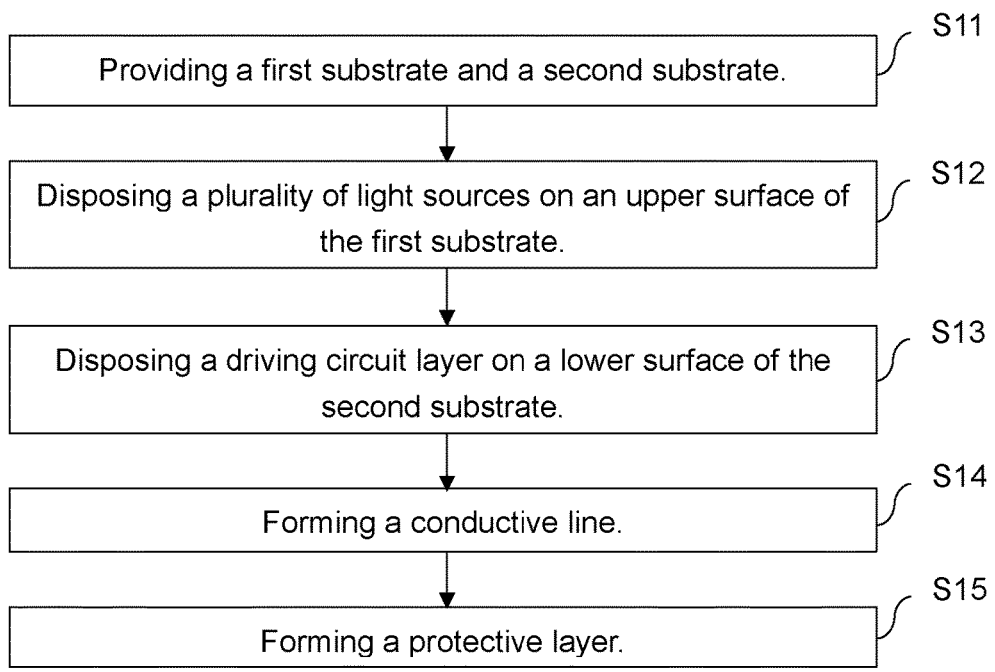
FIG. 2 is a flowchart of a manufacturing method of the backlight source according to the first embodiment.

As shown in FIG. 2, the present embodiment also provides a method of manufacturing a backlight source, including following steps S11) to S15).

S11): providing a first substrate and a second substrate, wherein the second substrate is disposed opposite to the first substrate. Specifically, a colloid is coated on an upper surface of the second substrate. Then, the first substrate and the second substrate are aligned. After that, the colloid is cured to form an adhesive layer, so that the upper surface of the second substrate and a lower surface of the first substrate can be tightly attached to each other. In other embodiments, a frame-bonding method may also be used, so that the first substrate and the second substrate are tightly attached to each other.

In the present embodiment, the first substrate and the second substrate are glass substrates, wherein a material of the second substrate may be a PCB board material such as a metal core printed circuit board (MCPCB), an FR-4 epoxy glass cloth laminated plate, or a CEM-3 composite material.

S12): disposing a plurality of light sources on an upper surface of the first substrate. Specifically, the light sources are evenly distributed on the first substrate. The light sources are mini-LEDs. Wherein, the first substrate and the light sources are assembled to form a light board.

Figure 3:
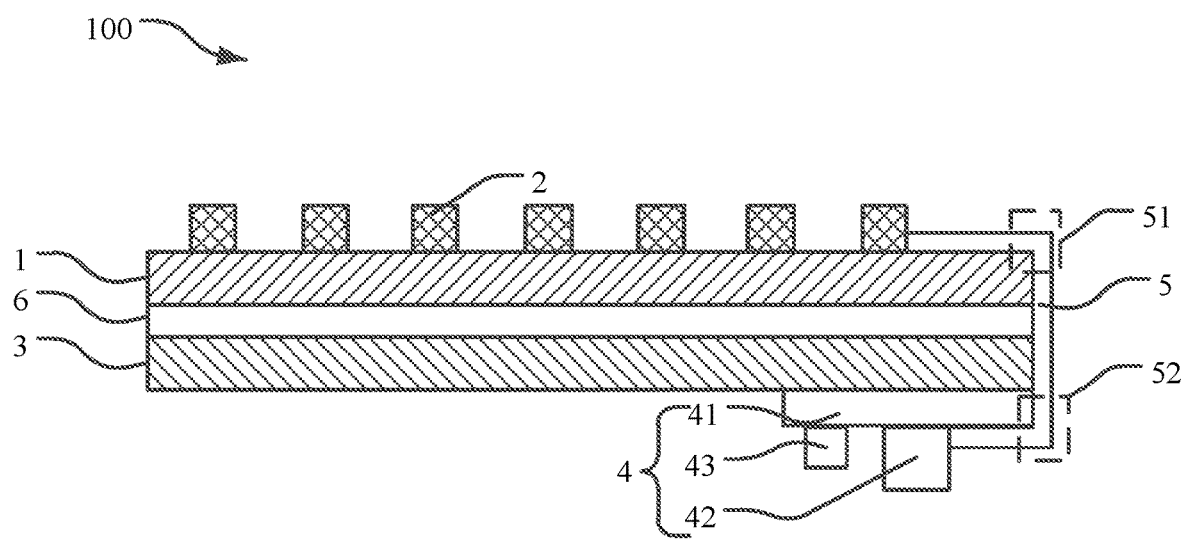
FIG. 3 is a structural schematic view showing a step of forming a conductive line according to the first embodiment.

S13): disposing a driving circuit layer on a lower surface of the second substrate and close to a lateral edge of the first substrate and a lateral edge the second substrate. Specifically, the driving circuit layer is disposed at a lower right of the second substrate and is attached to the lower surface of the second substrate. As shown in FIG. 3, the driving circuit layer 4 includes a circuit board 41, a connector 42, and a driving device 43. The circuit board 41 is a flexible circuit board (PCB). The connector 42 is disposed on a lower surface of the circuit board 41 and is located at an end of the first substrate 1 and an end of the second substrate 3. Furthermore, the circuit board 41 is close to a right lateral edge of the first substrate 1 and a right lateral edge of the second substrate 3 and is configured to connect external lines. The driving device 43 is disposed on the lower surface of the circuit board 41, is disposed on a same layer as the connector 42, and is configured to drive the light sources 2 to emit light.

S14): forming a conductive line. An end of the conductive line is connected to one of the light sources, and another end of the conductive line is bent and bound to the driving circuit layer. Specifically, the conductive line 5 is formed at the right lateral edge of the first substrate 1 and the right lateral edge of the second substrate 3 by a lateral-edge line printing method. The conductive line 5 is bent along the right lateral edge of the first substrate 1 and the right lateral edge of the second substrate 3 to a bottom of the second substrate 3. The driving circuit layer 4 is electrically connected to the light source by the conductive line 5. Please refer to FIG. 3, the conductive line 5 has a first bending part 51 and a second bending part 52. The first bending part 51 is located at an upper right corner of the first substrate 1, and the second bending part 52 is located at a lower right corner of the second substrate 52.

Figure 4:
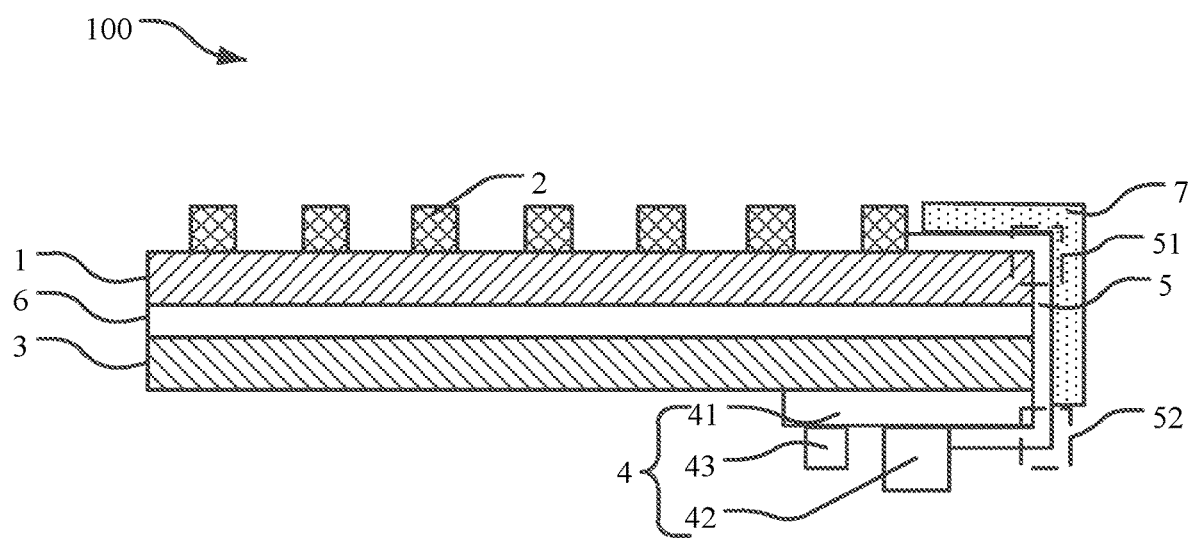
FIG. 4 is a structural schematic view showing a step of forming a protective layer according to the first embodiment.

S15): forming a protective layer on the lateral edge of the first substrate and the lateral edge of the second substrate and covering the conductive line. As shown in FIG. 4, the protective layer 7 is formed on the right lateral edge of the first substrate 1 and the right lateral edge of second substrate 3. A material of the protective layer is at least one of a silica gel, a silicone resin, or an epoxy resin. The protective layer completely covers an outer lateral wall of the first bending part, so that the first bending part is wrapped, thereby protecting the conductive line and preventing the conductive line from being damaged due to the driving circuit layer being pulled. Therefore, the conductive line is prevented from disconnection which affects conduction between the light sources and the driving circuit layer.

The present embodiment provides a backlight source and a manufacturing method thereof. A double-layer glass substrate replaces conventional single-layer glass substrate structures, thereby solving a problem of fragile glass substrates. A protective layer is disposed at an end of the double-layer glass substrate to protect a conductive line, thereby preventing the conductive line from being damaged. Conventional COF bonding structures are not used in the present embodiment, which is beneficial for structure assembly and appearance design.

Second Embodiment

The present embodiment provides a backlight source and a manufacturing method thereof, which include most of the technical solutions mentioned in the first embodiment. A difference is that the protective layer in the first embodiment is removed, and the backlight source provided in the present embodiment includes a through-hole. The through-hole penetrates the first substrate and the second substrate.

Figure 5:
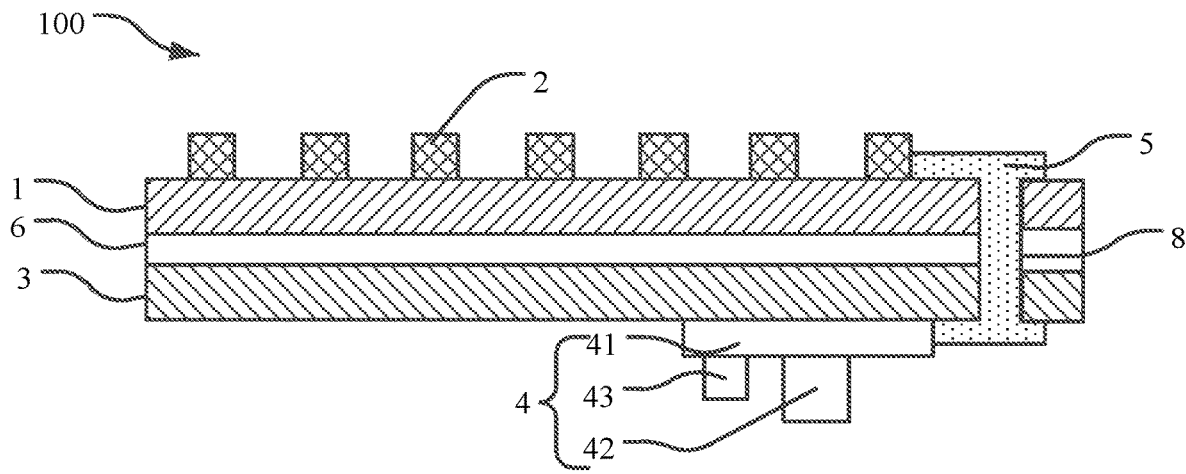
FIG. 5 is a structural schematic view showing a backlight source according to a second embodiment.

As shown in FIG. 5, the present embodiment provides a backlight source including a first substrate 1, a plurality of light sources 2, a second substrate 3, a driving circuit layer 4, a conductive line 5, an adhesive layer 6, and a through-hole 8.

The through-hole 8 penetrates the first substrate 1 and the second substrate 3 and is close to an end of the first substrate 1 and an end of the second substrate 3. Wherein, the conductive line 5 passes through the through-hole 8 and is bent and bound to the driving circuit layer 4.

Figure 6:
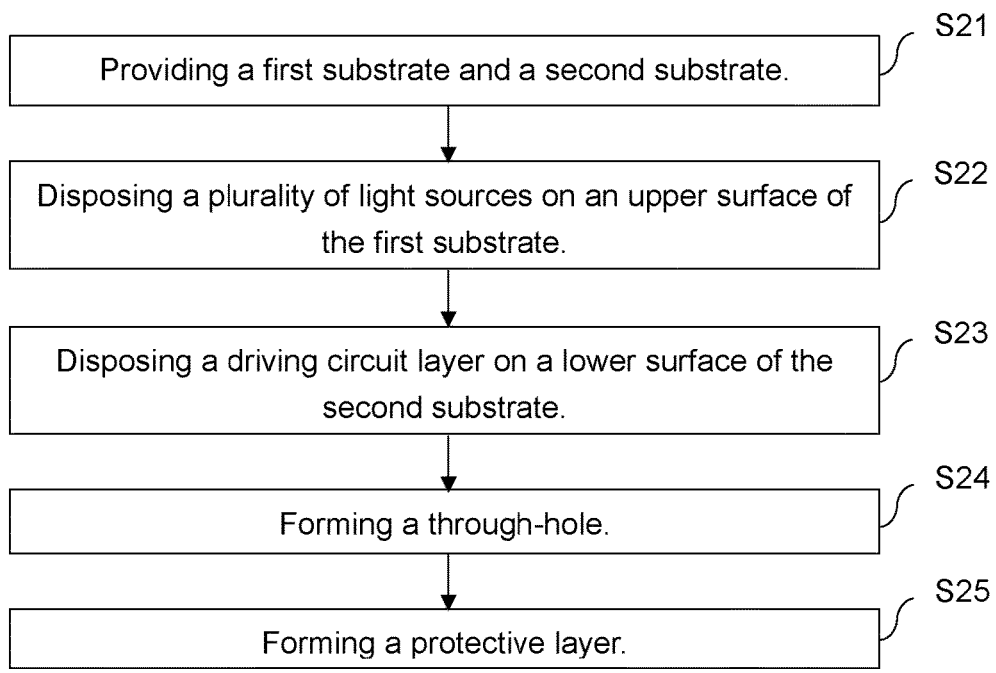
FIG. 6 is a flowchart of a manufacturing method of the backlight source according to the second embodiment.

As shown in FIG. 6, the present embodiment provides a method of manufacturing a backlight source, including following steps S21) to S25).

S21): providing a first substrate and a second substrate. The second substrate is disposed opposite to the first substrate. Specifically, a colloid is coated on an upper surface of the second substrate. The first substrate and the second substrate are aligned with each other. The colloid is cured to form an adhesive layer, so that the upper surface of the second substrate and a lower surface of the first substrate are tightly attached to each other. In other embodiments, the upper surface of the second substrate and the lower surface of the first substrate may also be tightly attached to each other by using a frame-bonding method.

In the present embodiment, the first substrate and the second substrate are glass substrates, wherein a material of the second substrate may be a PCB board material such as a metal core printed circuit board (MCPCB), an FR-4 epoxy glass cloth laminated plate, or a CEM-3 composite material.

S22): disposing a plurality of light sources on an upper surface of the first substrate. Specifically, the light sources are evenly distributed on the first substrate. The light sources are mini-LEDs. Wherein, the first substrate and the light sources are assembled to form a light board.

S23): A driving circuit layer is disposed on a lower surface of the second substrate and is close to a lateral edge of the first substrate and a lateral edge of the second substrate. Specifically, the driving circuit layer is disposed at a lower right of the second substrate and is attached to the lower surface of the second substrate.

Figure 7:
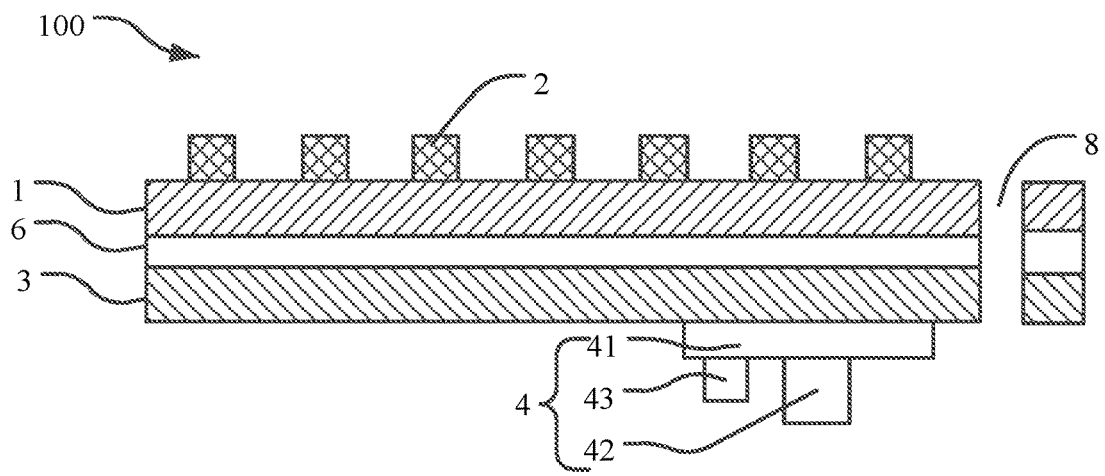
FIG. 7 is a structural schematic view showing a step of forming a through-hole according to the second embodiment.

S24): forming a through-hole which penetrates an end of the first substrate and an end of the second substrate and is close to the end of the first substrate and the end of the second substrate. As shown in FIG. 7, a right end of the first substrate 1 and a right end of the second substrate 3 are dug to form the through-hole 8.

Figure 8:
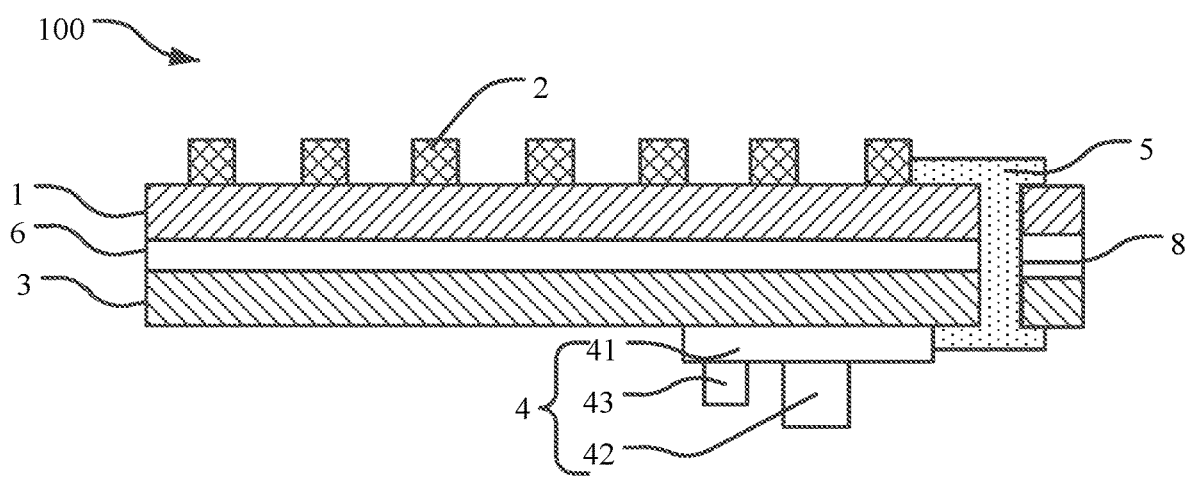
FIG. 8 is a structural schematic view showing a step of forming a conductive line according to the second embodiment.

S25): forming a conductive line. An end of the conductive line is connected to the light source, and another end of the conductive line is bent and bound to the driving circuit layer. As shown in FIG. 8, the through-hole 8 is filled with tin material by wave soldering, so that the end of the conductive line 5 is connected to one of the light sources 2, and another end of the conductive line 5 is connected to the driving circuit layer 4, thereby ensuring that the driving circuit layer 4 is electrically connected to the light source 2 by the conductive line 5. In the present embodiment, the through-hole is filled with the conductive line, thereby preventing the conductive line from being damaged when the driving circuit layer is pulled. Therefore, the conductive line is prevented from disconnection which affects conduction between the light sources and the driving circuit layer.

The present embodiment provides a backlight source and a manufacturing method thereof. A double-layer glass substrate replaces conventional single-layer glass substrate structures, thereby solving a problem of fragile glass substrates. A through-hole is defined at an end of the double-layer glass substrate. The conductive line passes through the through-hole to ensure that the conductive line will not be damaged. Conventional COF bonding structures are not used in the present embodiment, which is beneficial for structure assembly and appearance design.

In the above embodiments, the focus of each embodiment is different, and for a part that is not detailed in an embodiment, reference may be made to related descriptions of other embodiments.

A backlight source and a manufacturing method thereof have been described in detail with embodiments provided by the present disclosure which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A backlight source, comprising:
a first substrate;
a second substrate arranged opposite to the first substrate;
a plurality of light sources distributed on a first surface of the first substrate away from the second substrate;
a driving circuit layer disposed on a second surface of the second substrate away from the first substrate; and
a conductive line,
wherein an end of the conductive line is connected to one of the light sources, and another end of the conductive line is bent and bound to the driving circuit layer; and
wherein the conductive line is arranged on the first surface, a first lateral surface of the first substrate and a second lateral surface of the second substrate between the first substrate and the second substrate, and the second surface.

2. The backlight source of claim 1, further comprising:
a protective layer correspondingly disposed on a lateral edge of the first substrate and a lateral edge of the second substrate and covering the conductive line.

3. The backlight source of claim 1, further comprising:
an adhesive layer disposed between the first substrate and the second substrate.

4. The backlight source according to claim 3, wherein a thickness of the adhesive layer ranges from 200 μm to 2 mm.

5. The backlight source of claim 1, wherein the driving circuit layer includes:
a circuit board;
a connector disposed on a surface of a side of the circuit board and close to a lateral edge of the first substrate and a lateral edge of the second substrate; and
a driving device disposed on the surface of the side of the circuit board and disposed on a same layer as the connector.

6. The backlight source of claim 1, wherein the conductive line comprises a first bending portion and a second bending portion, the first bending portion warps a corner at a connection point of the first surface and the first lateral surface, and the second bending portion warps a corner at a connection point of the second surface and the second lateral surface.

7. The backlight source of claim 6, further comprising a protective layer, wherein the protective layer is attached on an outer surface of the conductive line and completely warps the first bending portion.

8. The backlight source of claim 7, the protective layer further warps the first lateral surface and the second lateral surface completely.

9. The backlight source of claim 1, wherein the driving circuit layer is disposed adjacent to the second lateral surface, and a portion of the conductive line arranged on the second surface is arranged on a side surface of the driving circuit layer away from the second substrate.

10. A method of manufacturing a backlight source, comprising following steps:
providing a first substrate and a second substrate, wherein the second substrate and the first substrate are disposed opposite to each other;
disposing a plurality of light sources on a first surface of the first substrate away from the second substrate;
disposing a driving circuit layer on a second surface of the second substrate away from the first substrate, wherein the driving circuit layer is close to a lateral edge of the first substrate and a lateral edge of the second substrate; and
forming a conductive line, wherein an end of the conductive line is connected to one of the light sources, and another end of the conductive line is bent and bound to the driving circuit layer, and the conductive line is arranged on the first surface, a first lateral surface of the first substrate and a second lateral surface of the second substrate between the first substrate and the second substrate, and the second surface.

11. The method of claim 10, further comprising a following step:
forming a protective layer on the lateral edge of the first substrate and the lateral edge of the second substrate and covering the conductive line.

12. The method of claim 10, wherein in the step of providing the first substrate and the second substrate, a third surface of the second substrate facing the first substrate is attached to a fourth surface of the first substrate facing the second substrate by an adhesive layer.

* * * * *